(12) United States Patent
Qian et al.

(10) Patent No.: US 10,145,731 B2
(45) Date of Patent: Dec. 4, 2018

(54) PERFORMANCE TESTING DEVICE FOR MULTI-CHANNEL TUNABLE LASER

(71) Applicant: Accelink Technologies Co., Ltd., Wuhan (CN)

(72) Inventors: Kun Qian, Wuhan (CN); Yanfeng Fu, Wuhan (CN); Xuesheng Tang, Wuhan (CN); Yi Tang, Wuhan (CN); Yizong Chen, Wuhan (CN); Di Zhang, Wuhan (CN); Shenglei Hu, Wuhan (CN); Weidong Ma, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 0 days.

(21) Appl. No.: 15/748,005

(22) PCT Filed: Dec. 15, 2015

(86) PCT No.: PCT/CN2015/097439
§ 371 (c)(1),
(2) Date: Jan. 26, 2018

(87) PCT Pub. No.: WO2017/016141
PCT Pub. Date: Feb. 2, 2017

(65) Prior Publication Data
US 2018/0216995 A1    Aug. 2, 2018

(30) Foreign Application Priority Data
Jul. 28, 2015 (CN) .......................... 2015 1 0449402

(51) Int. Cl.
*G01N 21/00* (2006.01)
*G01J 1/42* (2006.01)
*G01J 3/42* (2006.01)

(52) U.S. Cl.
CPC ............... *G01J 1/4257* (2013.01); *G01J 3/42* (2013.01); *G01J 2001/4247* (2013.01); *G01J 2003/423* (2013.01)

(58) Field of Classification Search
CPC ........ G01J 3/42; G01J 1/42; G01J 3/02; G01J 3/18; G01J 3/40; G01N 21/39; G01N 2021/399; G01N 2201/06; G02B 27/10
See application file for complete search history.

(56) References Cited

U.S. PATENT DOCUMENTS 6,507,400 B1   1/2003  Pina et al.
8,574,859 B2 * 11/2013  Lin ...................... A61B 5/0059
                                                        422/68.1
2004/0190568 A1  9/2004  Miller

FOREIGN PATENT DOCUMENTS

CN      101355228 A    1/2009
CN      102751656 A    10/2012
(Continued)

OTHER PUBLICATIONS

International Search Report for PCT/CN2015/097439 dated Mar. 24, 2016.

*Primary Examiner* — Abdullahi Nur
(74) *Attorney, Agent, or Firm* — Lerner, David, Littenberg, Krumholz & Mentlik, LLP

(57) ABSTRACT

A performance testing device for a multi-channel tunable laser, comprising a collimating and coupling lens, a first beam splitter, a power testing unit, a side-mode suppression ratio testing unit, a wavelength testing unit and a control and drive unit, the power testing unit being positioned in a reflection path of the first beam splitter, the wavelength testing unit being positioned in a transmission path of the first beam splitter, the side-mode suppression ratio testing unit being positioned in a reflection path of the second beam splitter, the control and drive unit being in a control con- (Continued)

nection with the power testing unit, the side-mode suppression ratio testing unit and the wavelength testing unit. The performance testing device has a simple structure, a low cost, and is convenient to use.

10 Claims, 3 Drawing Sheets

(56) References Cited

FOREIGN PATENT DOCUMENTS

| | | |
|---|---|---|
| CN | 103471813 A | 12/2013 |
| CN | 103647600 A | 3/2014 |
| CN | 103840889 A | 6/2014 |
| CN | 104538841 A | 4/2015 |
| CN | 104792497 A | 7/2015 |
| CN | 105115700 A | 12/2015 |
| JP | 2013179557 A | 9/2013 |
| WO | 2002052316 A2 | 7/2002 |

* cited by examiner ical Field

PERFORMANCE TESTING DEVICE FOR MULTI-CHANNEL TUNABLE LASER

CROSS REFERENCE TO RELATED APPLICATIONS

The present application is a national phase entry under 35 U.S.C. § 371 of International Application No. PCT/CN2015/097439, filed Dec. 15, 2015, which claims priority from Chinese Patent Application No. 201510449402.4 filed Jul. 28, 2015, all of which are hereby incorporated herein by reference.

TECHNICAL FIELD

The present invention relates to a low-cost output-performance testing device for a multi-channel tunable laser, and more particularly, to a testing device that may test varieties of output characteristics of the multi-channel tunable laser. The testing device of the present invention may be used to test performance of the multi-channel tunable laser in a DWDM communication system, and the present invention belongs to the field of communication.

BACKGROUND

With the boom of various emerging data applications, customs' demands for high-definition video and high-speed data services have been increasing rapidly, and the demand for network bandwidth also increases accordingly, which makes more urgent the construction of the broadband optical fiber access network. The metropolitan area network and the backbone network need a higher speed. The optical network will be developed toward IP-orientation, integration of more business, flexibility of resource allocation, and higher reliability, and a high speed and a large capacity will be goals of development of the future optical transmission network. The 100 Gbit/s communication system has been gradually commercialized, and the 400 Gbit/s communication system has become an inevitable development trend. Increasing of the transmission rate has put forward higher requirements on the laser used as a light source for the communication. If a traditional fixed wavelength laser is used, more than one laser is needed, which increases the cost of the system and limits expandability and flexibility of the optical network. If a tunable laser is used, the laser may include a reduced number of modules, has a decreased cost, and functionalities of the network may be enhanced. So, the tunable laser is the best choice for the light source in a high-speed coherent communication system. The tunable laser may be implemented as a monolithic integration laser, an external cavity laser, a hybrid integration laser, or a laser of other forms.

At present, the 100 Gbit/s high-speed communication system often adopts a multi-channel tunable laser with a C-band output wavelength in consistence with the ITU-T standard wavelength and a channel spacing of 50 GHz. Such a laser usually has about 100 channels, and depending on system requirements, each channel of the laser needs to be tested for varieties of output characteristics such as output power, output wavelength, side-mode suppression ratio and the like, so that the testing work of the laser is very tedious. The conventional approach is to use a plurality of test meters, such as a power meter to measure the output power of the laser, a wavelength meter to measure the output wavelength of the laser, a spectrometer to measure the side-mode suppression ratio of the laser, and the like, which causes many problems in the test process, for example, a large number of test meters, high cost, and time consumption. In allusion to these problems, the present invention proposes a multi-channel tunable laser testing device which integrates a plurality of performance testing functions for the tunable laser, and accordingly the cost of the testing system is decreased, the number of testing meters is reduced, and it may be operated easily. By control of a computer, a laser automatic testing system may be implemented, which can effectively improve the testing efficiency and may be used in batch production of the tunable lasers.

SUMMARY

An object of the present invention is to overcome a technical defect in the prior arts by providing a multi-channel tunable laser performance testing device for performance testing of the multi-channel tunable laser, which may test the output characteristics of the multi-channel tunable laser such as the output power, the output wavelength, the side-mode suppression ratio and the like simultaneously, and may be further combined with a computer to achieve an automatic testing system.

A technical solution of the present invention is as follows.

A performance testing device for a multi-channel tunable laser comprises a collimating and coupling lens, a first beam splitter, a power testing unit, a side-mode suppression ratio testing unit, and a control and drive unit in control connection with the power testing unit and the side-mode suppression ratio testing unit, the power testing unit comprising a second beam splitter positioned in a reflection path of the first beam splitter, and a first photodetector positioned in a transmission path of the second beam splitter, the side-mode suppression ratio testing unit comprising a third beam splitter, a fourth beam splitter, a first etalon, a second etalon, a third etalon, a second photodetector, a third photodetector, and a fourth photodetector, the third beam splitter being positioned in a reflection path of the second beam splitter, the first etalon and the second photodetector being positioned in this order in a reflection path of the third beam splitter, the fourth beam splitter being positioned in a transmission path of the third beam splitter, the second etalon and the third photodetector being positioned in this order in a reflection path of the fourth beam splitter, the third etalon and the fourth photodetector being positioned in this order in a transmission path of the fourth beam splitter, the first etalon, the second etalon, and the third etalon having a free spectral range three times as large as the channel spacing of the tunable laser under test, and any two of the etalons having a closest transmission peak distance that is the channel spacing of the tunable laser under test.

The first photodetector of the power testing unit needs to be calibrated, and the calibration may be carried out as follows: establishing a correspondence relationship between the input optical power of the performance testing device for the multi-channel tunable laser and the sampled photocurrent of the first photodetector.

The performance testing device further comprises a wavelength testing unit provided in the transmission path of the first beam splitter in connection with the control and drive unit, the wavelength testing unit comprising a fifth beam splitter, a sixth beam splitter, a tunable optical filter, a fourth etalon, a fifth photodetector, a sixth photodetector, and a seventh photodetector, the tunable optical filter and the fifth photodetector being positioned in this order in a transmission path of the fifth beam splitter, the sixth beam splitter being positioned in a reflection path of the fifth beam splitter, the seventh photodetector being positioned in a transmission path of the sixth beam splitter, and the fourth etalon and the sixth photodetector being positioned in this order in a reflection path of the sixth beam splitter.

The tunable optical filter has a wavelength tunable range equal to or larger than a wavelength tunable range of the tunable laser under test, and the tunable optical filter has a 3 dB filter band smaller than the spacing between two channels of the tunable laser under test.

The tunable optical filter may use a tunable filter including a combination of a grating and a mechanical adjustable plane mirror, a liquid crystal tunable filter, or a temperature-adjustable thermo-optical tunable filter.

The first etalon, the second etalon, the third etalon, and the fourth etalon are air-gap etalons plated on both end faces with a partial reflection film.

The first beam splitter, the second beam splitter, the third beam splitter, the fourth beam splitter, the fifth beam splitter, and the sixth beam splitter may adopt a thin-film beam splitter or a glued cubic prism beam splitter.

The third beam splitter and the fourth beam splitter of the side-mode suppression ratio testing unit constitute a beam splitter combination for distributing the incident light power of the unit.

A beam splitting ratio of reflection light versus transmission light of the third beam splitter is 1:2, and a beam splitting ratio of reflection light versus transmission light of the fourth beam splitter is 1:1.

A computer may be further provided, which may set the output of the multi-channel tunable laser and record the laser output characteristics measured for the current channel.

The present invention has the following advantages and positive effects:

1) The device of the present invention integrates varieties of performance testing functions for the multi-channel tunable laser, such as the power testing, the wavelength testing, the side-mode suppression ratio testing and the like. As compared with the conventional testing solution involving a number of testing meters, the testing device has a simple structure and effectively decreases the cost of the testing system.

2) The performance testing device of the present invention may be used with a computer to set up a multi-channel tunable laser automatic testing system, which may improve testing efficiency in batch production of the multi-channel tunable lasers.

Figure 1:
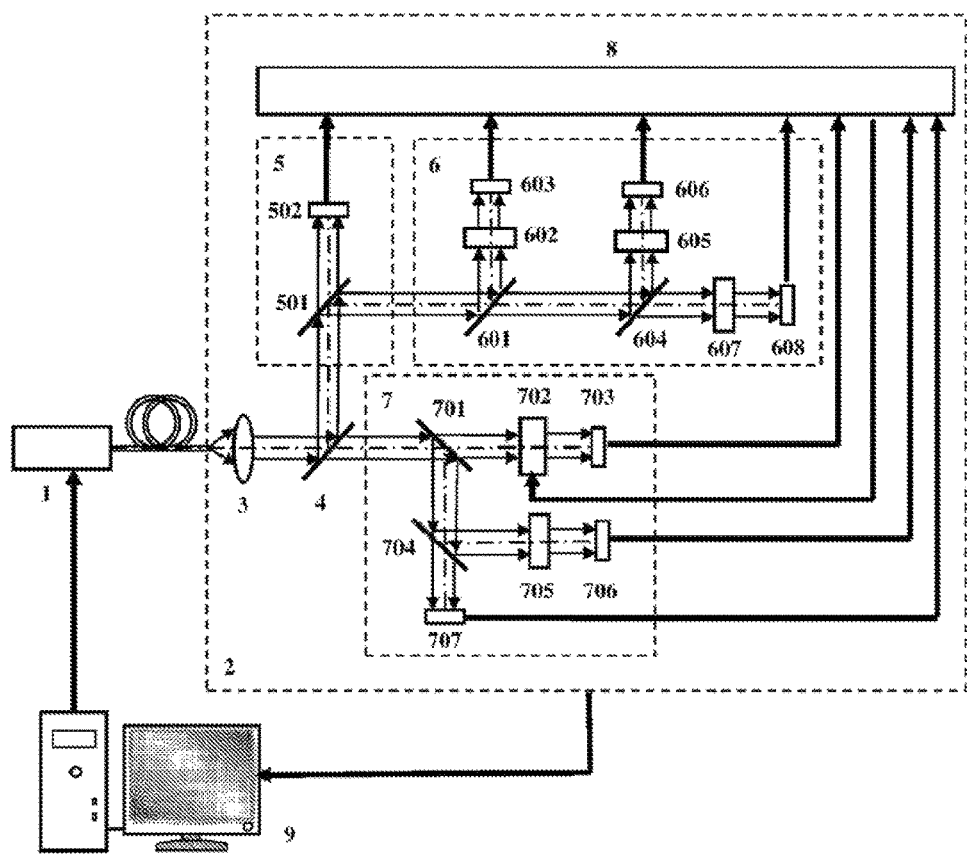
FIG. 1 is a schematic structural diagram showing a performance testing device for a multi-channel tunable laser according to the present invention.

wherein:

1: tunable laser under test
2: performance testing device for the multi-channel tunable laser
3: collimating and coupling lens
4: first beam splitter
5: power testing unit
501: second beam splitter
502: first photodetector
6: side-mode suppression ratio testing unit
601: third beam splitter
602: first etalon
603: second photodetector
604: fourth beam splitter
605: second etalon
606: third photodetector
607: third etalon
608: fourth photodetector
7: wavelength testing unit
701: fifth beam splitter
702: tunable optical filter
703: fifth photodetector
704: sixth beam splitter
705: fourth etalon
706: sixth photodetector
707: seventh photodetector
8: control and drive unit
9: computer

DESCRIPTION OF EMBODIMENTS

A further description will be given below with reference to the accompanying drawings and embodiments.

FIG. 1 shows a structural diagram of a performance testing device for a multi-channel tunable laser according to the present invention, and the performance testing device 2 for the multi-channel tunable laser mainly includes a collimating and coupling lens 3 for light beam collimation, a first beam splitter 4, a power testing unit 5, a side-mode suppression ratio testing unit 6, a wavelength testing unit 7, and a control and drive unit 8. The control and drive unit 8 is connected with the power testing unit 5, the side-mode suppression ratio testing unit 6, and the wavelength testing unit 7 to control them. The respective testing units feed back a testing signal to the control and drive unit 8, and the control and drive unit 8 outputs laser characteristic indexes according to the feedback signals and controls the respective testing units to carry out a next test. The power testing unit 5 includes a second beam splitter 501 positioned in a reflection path of the first beam splitter 4, and a first photodetector 502 positioned in a transmission path of the second beam splitter 501. The side-mode suppression ratio testing unit 6 is positioned in a reflection path of the second beam splitter 501. The second beam splitter 501 splits an incident light beam from the first beam splitter 4 further into two parts by a certain ratio, of which the transmission light is incident to the first photodetector 502 for optical power testing, and the reflection light is incident to the side-mode suppression ratio testing unit 6.

The side-mode suppression ratio testing unit 6 includes a third beam splitter 601, a fourth beam splitter 604, a first etalon 602, a second etalon 605, a third etalon 607, a second photodetector 603, a third photodetector 606, and a fourth photodetector 608. The third beam splitter 601 and the fourth beam splitter 604 function to distribute an incident light power for the side-mode suppression ratio testing unit 6. The third beam splitter 601 is located in a reflection path of the second beam splitter 501, the reflection light from the third beam splitter 601 is incident to the first etalon 602, and the second photodetector 603 is placed after the first etalon 602 for detecting the optical power passing through the first etalon 602. The transmission light from the third beam splitter 601 is incident to the fourth beam splitter 604, and the reflection light from the fourth beam splitter 604 is incident to the second etalon 605. The third photodetector 606 is placed after the second etalon 605 for detecting the optical power passing through the second etalon 605. The transmission light from the fourth beam splitter 604 is incident to the third etalon 607, and the fourth photodetector 608 is placed after the third etalon 607 for detecting the optical power passing through the third etalon 607.

The first etalon 602, the second etalon 605, and the third etalon 607 have a free spectral range three times as large as a channel spacing of the tunable laser 1 under test, and any two of the etalons have a closest distance between transmission peaks that is the channel spacing of the tunable laser 1 under test.

The wavelength testing unit 7 is located in a transmission path of the first beam splitter 4 and is connected with the control and drive unit 8. The wavelength testing unit 7 includes a fifth beam splitter 701, a sixth beam splitter 704, a tunable optical filter 702, a fourth etalon 705, a fifth photodetector 703, a sixth photodetector 706, and a seventh photodetector 707. The transmission path of the fifth beam splitter 701 is provided with the tunable optical filter 702, and the fifth photodetector 703 is placed after the tunable optical filter 702. The reflection path of the fifth beam splitter 701 is provided with the sixth beam splitter 704, the transmission path of the sixth beam splitter 704 is provided with the seventh photodetector 707, and the reflection path of the sixth beam splitter 704 is provided with the fourth etalon 705. The sixth photodetector 706 is placed after the fourth etalon 705.

The wavelength testing unit 7 is composed of a wavelength coarse testing section and a wavelength fine testing section. The wavelength coarse testing section functions to determine the output wavelength (output channel) of the laser under test, and the wavelength fine testing section functions to measure a precise output wavelength of the laser under test.

The fifth beam splitter 701 splits the incident light of the wavelength testing unit 7 into two beams by a certain ratio, of which the transmission light is incident to the wavelength coarse testing section, and the reflection light is incident to the wavelength fine testing section. The wavelength coarse testing section of the wavelength testing unit 7 includes the tunable optical filter 702 and the fifth photodetector 703. The transmission light from the fifth beam splitter 701 is incident to the tunable optical filter 702 where it is filtered. The fifth photodetector 703 is placed after the tunable optical filter 702 to measure the optical power passing through the tunable optical filter 702. The wavelength tunable range of the tunable optical filter 702 is equal to or greater than the wavelength tunable range of the tunable laser 1 under test, and the 3 dB bandwidth of the filter band should be smaller than the spacing between two channels of the tunable laser, in which case only one laser channel may be transmitted through in its 3 dB bandwidth. The wavelength fine testing section of the wavelength testing unit 7 includes the sixth beam splitter 704, the fourth etalon 705, the sixth photodetector 706, and the seventh photodetector 707. The sixth beam splitter 704 splits the light incident to the wavelength fine testing section into two beams by a certain ratio, of which the transmission light is incident to the seventh photodetector 707, and the reflection light is incident to the fourth etalon 705. The sixth photodetector 706 is placed after the fourth etalon 705 to detect the optical power passing through the fourth etalon 705. The free spectral range of the fourth etalon 705 is equal to the channel spacing of the tunable laser 1 under test, and the maximum slope point of the transmission peak corresponds to the standard channel output wavelength of the tunable laser.

The tunable optical filter 702 adopts a tunable filter including a combination of a grating and a mechanical adjustable plane mirror, a liquid crystal tunable filter, or a temperature-adjustable thermo-optical tunable filter. The tunable filter including a combination of a grating and a mechanical adjustable plane mirror utilizes the grating to disperse the light beam, and an angle between the plane mirror and the grating may be adjusted by mechanically adjusting the plane mirror so that a different diffraction angle of the grating may be selected, thereby changing the center wavelength of the filter band. The liquid crystal tunable filter utilizes photoelectric characteristics of the liquid crystal and changes the voltage applied on the liquid crystal filter to change the refractive index of the liquid crystal, thereby changing the center wavelength of the filter band. The thermo-optical tunable filter utilizes the thermo-optical characteristics of material and changes the refractive index of the material by changing the temperature of the material, thereby changing the center wavelength of the filter band.

The first beam splitter 4, the second beam splitter 501, the third beam splitter 601, the fourth beam splitter 604, the fifth beam splitter 701, and the sixth beam splitter 704 adopt a thin-film beam splitter or a glued cubic prism beam splitter that has a beam splitting function.

The device of the present invention may achieve the following process:

A laser beam output from a tail fiber of the tunable laser 1 under test enters into the performance testing device 2 for the multi-channel tunable laser, where it is collimated by the collimating and coupling lens 3 into a parallel beam, split by the first beam splitter, and incident to the power testing unit 5, the side-mode suppression ratio testing unit 6, and the wavelength testing unit 7. These test units, under control of the control and drive unit 8, test the power characteristics, the side-mode suppression ratio characteristics, and the wavelength characteristics of the laser beam output from the laser, respectively, and feed back testing information to the control and drive unit 8 for further analysis to output the testing results. If a computer 9 is added, an automatic testing system for the multi-channel tunable laser may be set up. The computer 9 may set the multi-channel tunable laser 1 to output laser of a different channel, the performance testing device 2 for the multi-channel tunable laser may measure the output characteristics of the channel, and the measured characteristics may be recorded in the computer 9. After testing of the channel is completed, the computer 9 may set the laser to output a laser beam of the next channel.

Figure 2:
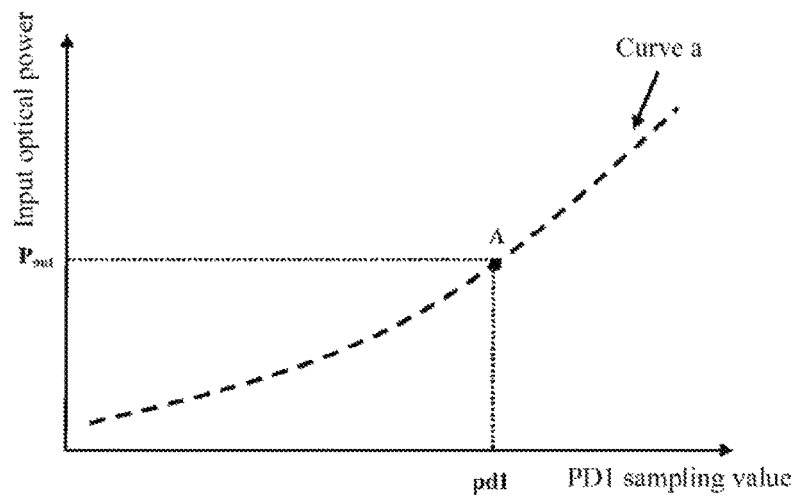
FIG. 2 is a diagram showing testing principle of the power testing unit according to the present invention.

The power testing unit 5 implements the power testing function mainly by the first photodetector 502. Before the performance testing device 2 for the multi-channel tunable laser is used, the first photodetector 502 needs to be calibrated. FIG. 2 shows the testing principle of the power testing unit. Before the testing device is used, different laser output powers set with a certain interval within the measurable power range of the testing device may be provided to the performance testing device 2, and the photocurrent sampling values of the first photodetector 502 corresponding to the input powers are recorded. Then, based on the input power values and the photocurrent sampling values PD1 of the first photodetector 502, an input optical power-PD1 sampling value relation curve may be fitted, i.e., the curve a as shown in FIG. 2, and the curve may be stored in the control and drive unit 8. When the testing device is used, assuming that the first photodetector 502 measures a photocurrent sampling value pd1, the control and drive unit 8 may calculate the corresponding output optical power Pout of the tunable laser 1 under test according to the curve a.

In the side-mode suppression ratio testing unit 6, the third beam splitter 601 and the fourth beam splitter 604 are provided as a beam splitter combination to distribute the incident optical power for the unit. In the embodiment of the present invention, the third beam splitter 601 may have a beam splitting ratio 1:2 of the reflection light versus the transmission light, and the fourth beam splitter 604 may have a beam splitting ratio 1:1 of the reflection light versus the transmission light. Thus, the optical power obtained from the beam splitter 5 is divided into three equal parts by the third beam splitter 601 and the fourth beam splitter 604, which are incident to the second photodetector 603, the third photodetector 606 and the fourth photodetector 608 through the first etalon 602, the second etalon 605, and the third etalon 607, respectively. In order to ensure accuracy of the testing results, the three etalons are required to have both end faces plated with a reflective film with the same reflectivity and to have the same thickness, and the three photodetectors are required to have the same responsivity. The free spectral range of the first etalon 602, the second etalon 605, and the third etalon 607 may be three times as large as the channel spacing of the tunable laser 1 under test, and the closest distance between the transmission peaks of any two etalons is the channel spacing of the tunable laser 1 under test. The first etalon 602, the second etalon 605, and the third etalon 607 each may adopt an air-gap etalon plated with a partial reflective film on both end faces to reduce influence of the environment temperature change on the transmission spectrum of the etalon.

Figure 3:
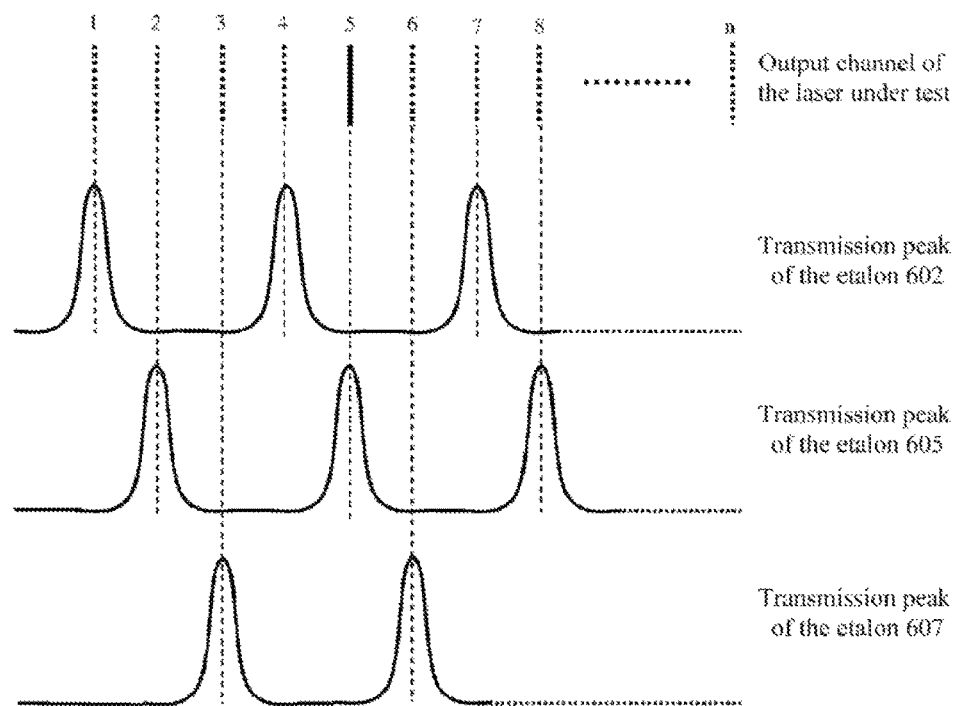
FIG. 3 is a diagram showing testing principle of the side-mode suppression ratio testing unit according to the present invention.

FIG. 3 shows the testing principle of the side-mode suppression ratio testing unit 6. Assuming that the tunable laser under test has n output channels, the first etalon 602 may have transmission peak wavelengths corresponding to the output wavelengths of the channels 1, 4, 7, . . . 3*i+1 (i is an integer), the second etalon 605 may have transmission peak wavelengths corresponding to the output wavelengths of the channels 2, 5, 8, . . . 3*i+2, and the third etalon 607 may have transmission peak wavelengths corresponding to the output wavelengths of the channels 3, 6, 9, . . . 3*i+3. If the current output channel of the laser is the channel 5, the second etalon 605 is used to detect the main frequency output power of the laser, the first etalon 602 is used to detect the side-mode power in a shorter wave direction of the main frequency of the laser, and the third etalon 607 is used to detect the side-mode power in a longer wave direction of the main frequency of the laser. The second photodetector 603, the third photodetector 606, and the fourth photodetector 608 detect the photocurrents at this moment respectively, feed back the three photocurrent values to the control and drive unit 8. Two larger values among the three photocurrent values may be selected and a ratio thereof may be calculated to determine the side-mode suppression ratio.

Figure 4A:
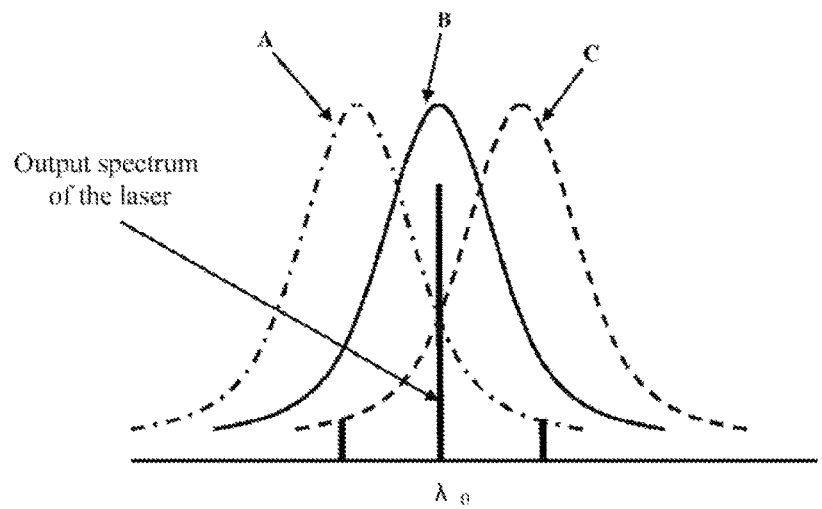
FIG. 4(a) is a diagram showing principle of coarse wavelength testing of the wavelength testing unit according to the present invention.

FIG. 4(a) shows the testing principle of the wavelength coarse testing section of the wavelength testing unit 7. The tunable optical filter 702, under control of the control and drive unit 8, traverses the entire wavelength tunable range by a certain wavelength step, starting from the shorter wavelength side. Assuming that the output wavelength of the laser under test is λ0, the transmittance curve of the tunable optical filter 702 changes from A to B to C (A→B→C) in a range in close proximity to the wavelength λ0, and the sampled photocurrent of the fifth photodetector 703 obtains a maximum value when the transmission peak of the tunable optical filter 702 corresponds to the output wavelength λ0 of the laser. The control and drive unit 8 records the driving condition of the tunable optical filter 702 at this time, and the transmission peak wavelength of the tunable optical filter 702 corresponding to the driving condition is the coarse testing wavelength of the laser.

Figure 4B:
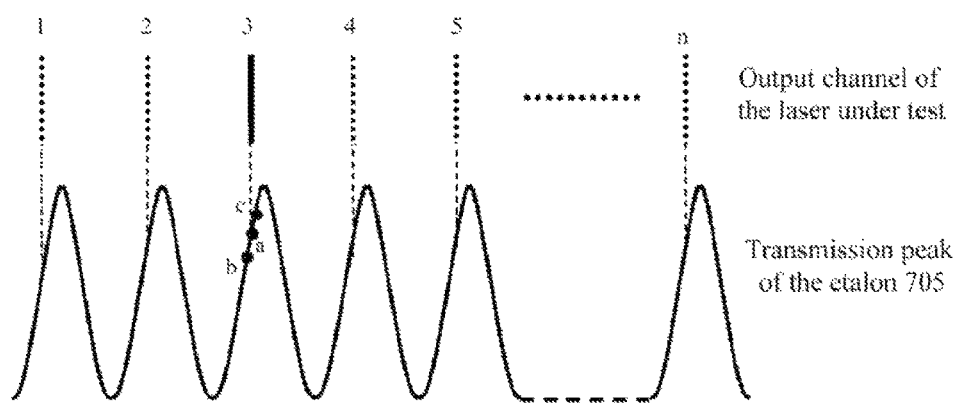
FIG. 4(b) is a diagram showing principle of fine wavelength testing of the wavelength testing unit according to the present invention.

FIG. 4(b) shows the testing principle of the wavelength fine testing section. The fourth etalon 705 adopts an air-gap etalon having both end faces plated with a partial reflective film, and a maximum slope point of the transmission spectrum of the etalon corresponds to a standard output wavelength of the laser under test. Assuming that the optical power incident to the seventh photodetector 707 is $P_1$, the sampled photocurrent is $I_1$, the optical power incident to the sixth photodetector 706 through the fourth etalon 705 is $P_2$, and the sampled photocurrent is $I_2$. A photocurrent ratio of the sixth photodetector 706 versus the seventh photodetector 707 is $m=I_2/I_1$. When the tunable laser 1 under test outputs a standard wavelength of the channel 3, the fourth etalon 705 has a corresponding point a on its transmission peak, and the ratio of the sixth photodetector 706 versus the seventh photodetector 707 is $m_0 I_2/I_1$. When the output wavelength of the tunable laser 1 under test is of the channel 3 but slightly less than the standard wavelength of the channel 3, the fourth etalon 705 has a corresponding point b on its transmission peak, and the ratio of the sixth photodetector 706 versus the seventh photodetector 707 is $m_1=I_2/I_1<m_0$. When the output wavelength of the tunable laser 1 under test is of the channel 3 but slightly larger than the standard wavelength of the channel 3, the fourth etalon 705 has a corresponding point c on its transmission peak, and the ratio of the sixth photodetector 706 versus the seventh photodetector 707 is $m_2=I_2/I_1>m_0$. The relationship between the input wavelength and the photocurrent ratio m is calibrated before the testing device is used. In the testing, a deviation $\Delta\lambda$ between the output wavelength and the standard wavelength may be calculated according to the photocurrent m. Then, based on the coarse testing wavelength obtained by the wavelength coarse testing section, a standard channel output wavelength closest to the coarse testing wavelength may be determined. The standard channel output wavelength plus the wavelength deviation $\Delta\lambda$ obtained by the fine testing section is the precise wavelength of the laser measured by the testing device.

At present, the wavelength accuracy of the multi-channel tunable laser required for the commercial high-speed communication system is ±20 pm, or even ±12 pm. Accordingly, the accuracy of the output wavelength of the tunable laser is very important. In the present invention, the performance testing device 2 for the multi-channel tunable laser includes the wavelength fine testing section to improve the wavelength testing accuracy of the testing device. It should be noted that the side-mode of the multi-channel tunable laser tested by performance testing device of the present invention only appears in a particular channel within one channel spacing from its output channel.

Although the present invention has been illustrated and described in detail by reference to specific embodiments, it will be apparent to those skilled in the art that upon reading and understanding of the specification and drawings, various changes may be made to details of structure and fabrication of the performance testing device for the multi-channel tunable laser without departing from the spirit and scope of the present invention. Such changes will fall within the protection scope as claimed in the claims of the present invention.

The invention claimed is:

1. A performance testing device for a multi-channel tunable laser, comprising:
   a collimating and coupling lens, a first beam splitter, a power testing unit, a side-mode suppression ratio testing unit, and a control and drive unit, the control and drive unit being in control connection with the power testing unit and the side-mode suppression ratio testing unit;
   the power testing unit comprising a second beam splitter positioned in a reflection path of the first beam splitter, and a first photodetector positioned in a transmission path of the second beam splitter;
   the side-mode suppression ratio testing unit comprising a third beam splitter, a fourth beam splitter, a first etalon, a second etalon, a third etalon, a second photodetector, a third photodetector, and a fourth photodetector, the third beam splitter being positioned in a reflection path of the second beam splitter, along a reflection path of the third beam splitter being provided the first etalon and the second photodetector in this order, along a transmission path of the third beam splitter being provided the fourth beam splitter, along a reflection path of the fourth beam splitter being provided the second etalon and the third photodetector in this order, along a transmission path of the fourth beam splitter being provided the third etalon and the fourth photodetector in this order, the first etalon, the second etalon and the third etalon having a free spectral range three times as large as a channel spacing of the tunable laser under test, and the closest distance between transmission peaks of any two of the etalons being equal to the channel spacing of the tunable laser under test.

2. The performance testing device for a multi-channel tunable laser of claim 1, wherein:
   the first photodetector of the power testing unit is calibrated by establishing a correspondence relationship between the input optical power of the performance testing device for a multi-channel tunable laser and the sampled photocurrent of the first photodetector.

3. The performance testing device for a multi-channel tunable laser of claim 1, further comprising a wavelength testing unit provided in a transmission path of the first beam splitter in connection with the control and drive unit, the wavelength testing unit comprising a fifth beam splitter, a sixth beam splitter, a tunable optical filter, a fourth etalon, a fifth photodetector, a sixth photodetector, and a seventh photodetector, along a transmission path of the fifth beam splitter being provided the tunable optical filter and the fifth photodetector in this order, along a reflection path of the fifth beam splitter being provided the sixth beam splitter, the seventh photodetector being provided in a transmission path of the sixth beam splitter, and along a reflection path of the sixth beam splitter being provided the fourth etalon and the sixth photodetector in this order.

4. The performance testing device for a multi-channel tunable laser of claim 3, wherein the tunable optical filter has a wavelength tunable range equal to or greater than that of the tunable laser under test, and a 3 dB bandwidth of the filter band of the tunable optical filter is smaller than a spacing between two channels of the tunable laser under test.

5. The performance testing device for a multi-channel tunable laser of claim 4, wherein the tunable optical filter adopts a tunable filter including a combination of a grating and a mechanical adjustable plane mirror, or a liquid crystal tunable filter, or a temperature adjustable thermo-optical tunable filter.

6. The performance testing device for a multi-channel tunable laser of claim 3, wherein the first etalon, the second etalon, the third etalon and the fourth etalon comprise an air-gap etalon having both end faces plated with a partial reflective film.

7. The performance testing device for a multi-channel tunable laser of claim 3, wherein the first beam splitter, the second beam splitter, the third beam splitter, the fourth beam splitter, the fifth beam splitter, and the sixth beam splitter comprise a thin-film beam splitter or a glued cubic prism beam splitter.

8. The performance testing device for a multi-channel tunable laser of claim 1, wherein the third beam splitter and the fourth beam splitter of the side-mode suppression ratio testing unit fare provided as a splitter combination to distribute the incident optical power of the unit.

9. The performance testing device for a multi-channel tunable laser of claim 8, wherein the third beam splitter has a reflection-to-transmission ratio of 1:2, and the fourth beam splitter has a reflection-to-transmission ratio of 1:1.

10. The performance testing device for a multi-channel tunable laser of claim 1, further comprising a computer to set the output of the multi-channel tunable laser and record the output characteristics measured for the current channel of the laser.

* * * * *